United States Patent [19]

Casale

[11] Patent Number: 4,664,443
[45] Date of Patent: May 12, 1987

[54] AUTOMOBILE CONVERTIBLE SEAT

[76] Inventor: Rudy J. Casale, 2502 E. 66 St., Brooklyn, N.Y. 11234

[21] Appl. No.: 796,541

[22] Filed: Nov. 8, 1985

[51] Int. Cl.$^4$ ............................................. A47C 15/00
[52] U.S. Cl. ................................... 297/238; 297/408; 297/488
[58] Field of Search ................ 297/238, 487, 488, 408

[56] References Cited

U.S. PATENT DOCUMENTS

| | | | |
|---|---|---|---|
| 1,268,979 | 6/1918 | Krum et al. | 297/487 X |
| 2,584,481 | 2/1952 | Mast et al. | 297/238 X |
| 2,966,201 | 12/1960 | Stahler | 297/238 |
| 3,888,329 | 6/1975 | Monaghan | 297/488 |
| 3,951,450 | 4/1976 | Gambotti | 297/238 |
| 4,230,366 | 10/1980 | Ruda | 297/487 |
| 4,533,176 | 8/1985 | Wyttenbach | 297/238 |
| 4,540,216 | 9/1985 | Hassel, Sr. | 297/238 |

FOREIGN PATENT DOCUMENTS

| | | | |
|---|---|---|---|
| 3019153 | 12/1981 | Fed. Rep. of Germany | 297/487 |
| 3215488 | 11/1983 | Fed. Rep. of Germany | 297/238 |
| 2060511 | 5/1981 | United Kingdom | 297/488 |

*Primary Examiner*—Francis K. Zugel
*Attorney, Agent, or Firm*—Lilling & Greenspan

[57] ABSTRACT

An automobile seat includes a head rest for use by an adult which can be converted to an infant seat by pivoting a portion of the back rest forwardly and extending the infant or child seat from a storage compartment, and lowering the head rest which can be locked or secured to the child seat to serve as a restraint for the child. The child seat, which is pivotally mounted between its retracted and extended positions, is locked in each of said positions to provide security and reliability in both modes of operation or use.

8 Claims, 6 Drawing Figures

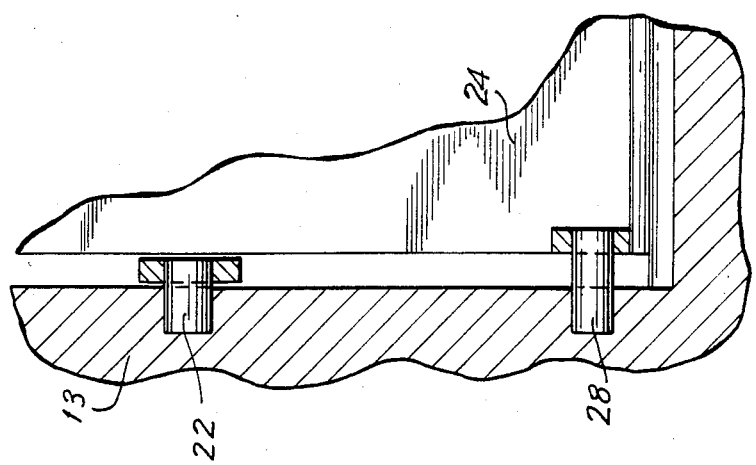
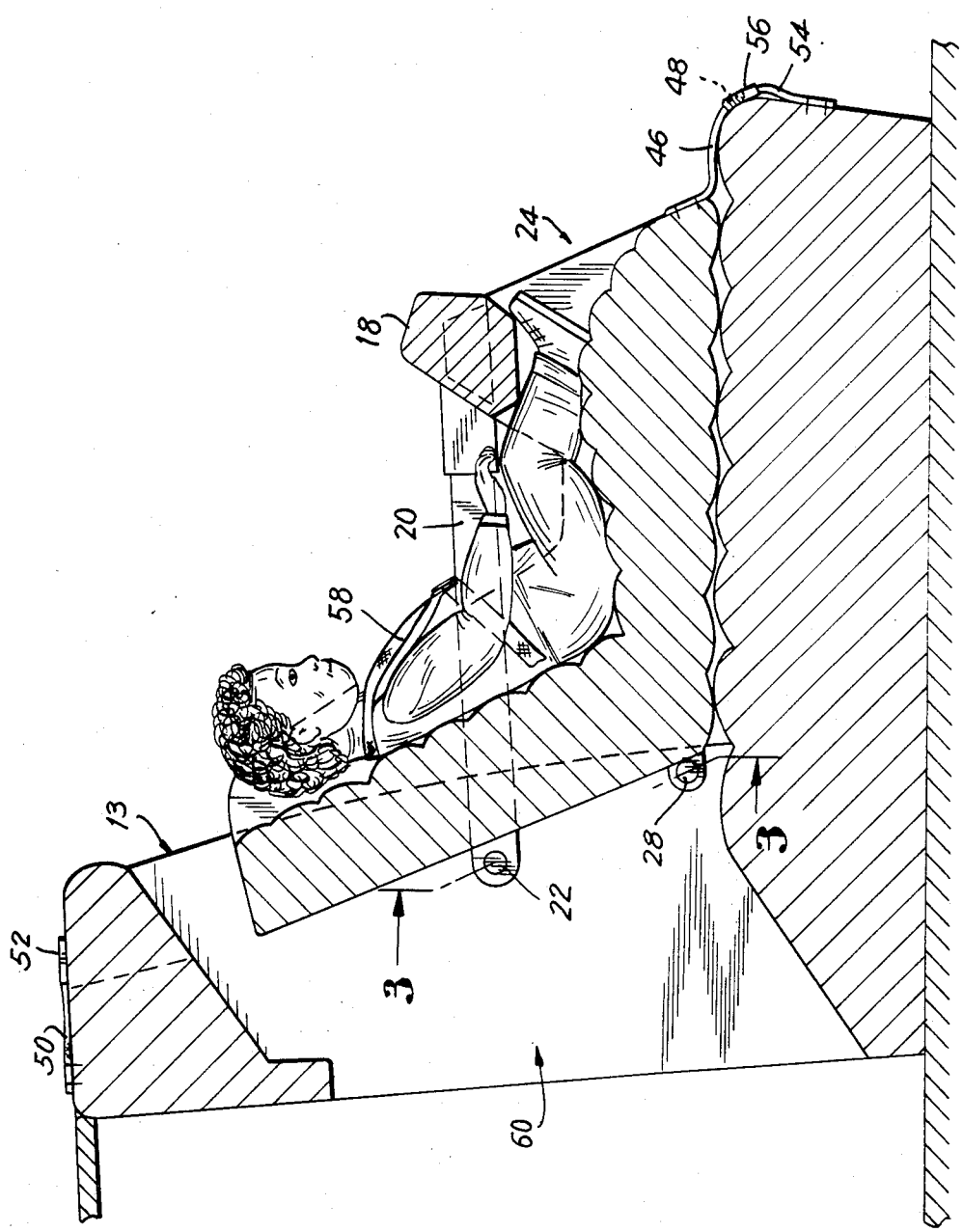

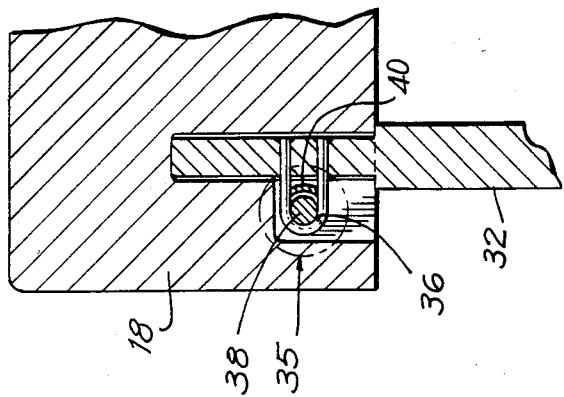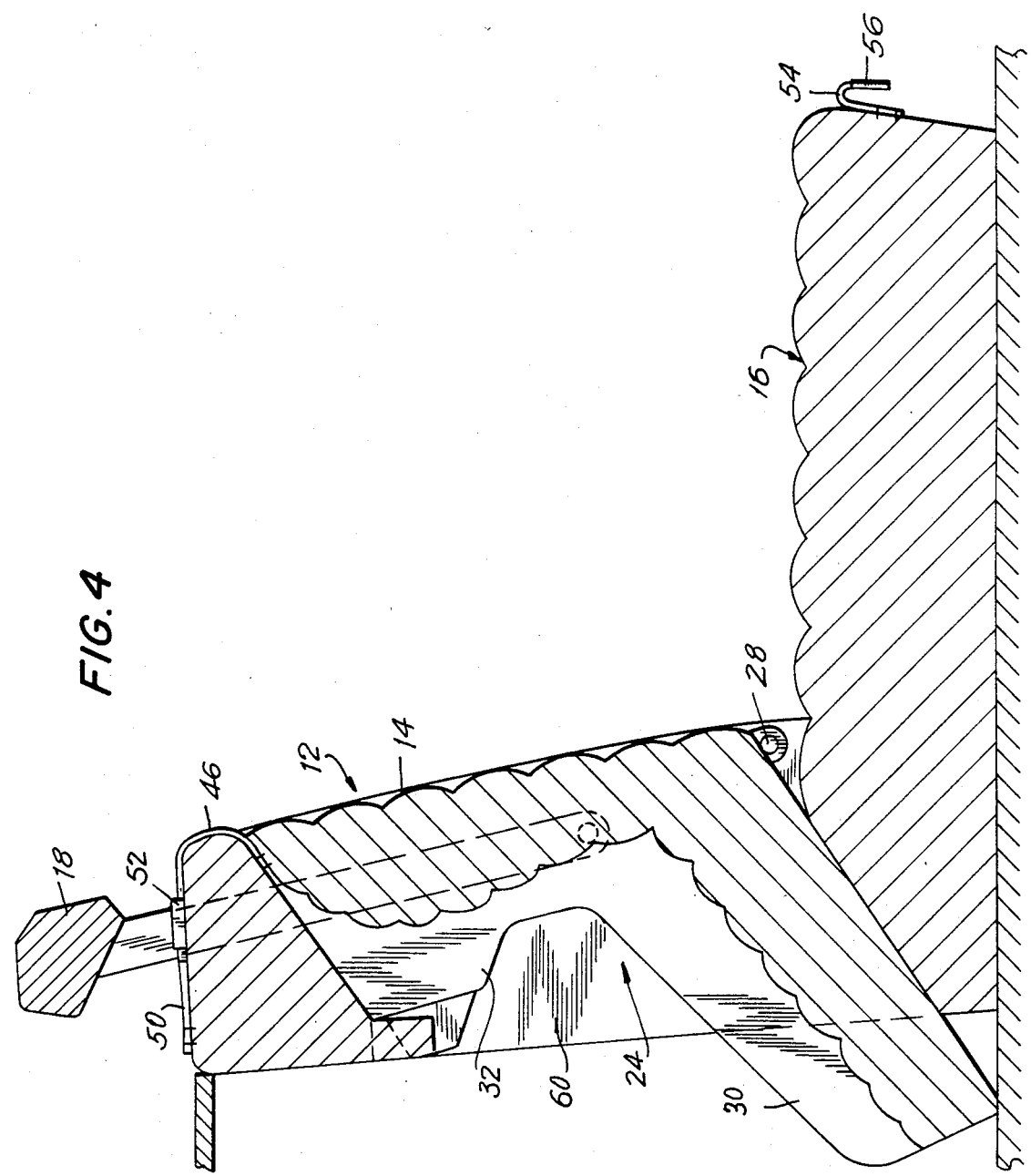

AUTOMOBILE CONVERTIBLE SEAT

BACKGROUND OF THE INVENTION

This invention generally relates to automobile seats, and more particularly to an automobile seat which converts from an adult seat to an infant seat.

An automobile adult seat does not provide adequate safety for children, particularly very young infants. Numerous devices have been proposed for enhancing the safety for children while driving in automobiles. While seat belts have provided some measure of safety for older children, separate smaller seats have generally been used for young infants since these tend to restrain the child from movement in almost every direction.

In most instances, these infant seats have been separate seats which can be installed on an adult automobile seat and secured in some fashion thereto by means of, for example, the adult seat belts. This type of infant seat suffers from two primary disadvantages. Firstly, if the infant seat is improperly fastened to the adult seat, the seat can move relative to or separate from the adult seat thereby failing to provide the expected restraint on the child. Secondly, the adult seat to which the infant seat is attached is clearly not usable by the adult until the infant seat is removed. Therefore, whenever an adult needs to use the seat, the infant seat must be removed and stored until the next time it is needed for the infant. In addition to being a time consuming and inconvenient procedure, the infant seat must again be carefully secured to the adult seat each time that the infant needs to use same.

As a result of the disadvantages discussed above in connection with movable or portable infant seats, there has also been proposed infant seats which are integrally built into an adult automobile seat such that the adult seat can be converted into an infant seat typically by moving one or more members of the adult seat and uncovering and unfolding the infant seat into its desired position.

The infant seats of this type generally provide a child restraint which is in the nature of a bar or padded portion which is placed in front of the child while it is within the infant seat. The restraint, however, serves no other function, for example, when the infant seat is converted into an adult seat. The infant seats, therefore, have tended to be complex in construction and expensive to manufacture, and have not always provided the measure of safety or strength that the child restraint is intended to provide.

SUMMARY OF THE INVENTION

In order to overcome the advantages inherent in the prior art convertible infant seat constructions, the seat in accordance with the present invention includes a back rest section and a seat section. The back rest section includes a generally fixed portion and a movable portion. A head rest is pivotally mounted for movements between an upper position generally above said back rest section when the seat is to be used as an adult and in a lower position generally in front of said back rest section when the seat is to be used by a child. A child seat is provided which is pivotally mounted for movements between retracted and extended positions and includes said movable back rest portion. Said child seat is retracted when the seat is to be used by an adult to position said movable back rest portion generally proximate to said fixed back rest portion. Said child seat is extended for receiving a child and to position said movable back rest portion generally proximate to said seat section. In this manner, said head rest serves both to support the head of an adult in the retracted position of said child seat and serves to restrain a child from falling out of said child seat in the extended position of said child seat. The head rest, therefore, serves a dual purpose and facilitates the conversion between an adult seat and an infant seat and, therefore, makes the use of such convertible seat more practical and convenient.

BRIEF DESCRIPTION OF THE DRAWINGS

The foregoing and other features of the present invention will be more readily apparent from the following detailed description and drawings of an illustrative emobodment of the invention in which:

FIG. 2 is an enlarged cross-sectional view of the convertible automobile seat shown in FIG. 1, taken along line 2—2;

FIG. 3 is a cross-sectional view of the seat shown in FIG. 2, taken along line 3—3, showing the details of the pivot pins for pivoting the child seat and the head rest between predetermined positions for use by an adult or child;

FIG. 4 is a view similar to FIG. 2, but showing the child seat in the retracted position converting the seat into an adult seat;

FIG. 5 is an enlarged cross-sectional view of the child seat as shown in FIG. 1, taken along line 5—5, showing the details of the locking mechanism for locking the head rest to the child seat;

DETAILED DESCRIPTION OF THE PREFERRED EMBODIMENTS

Figure 1:
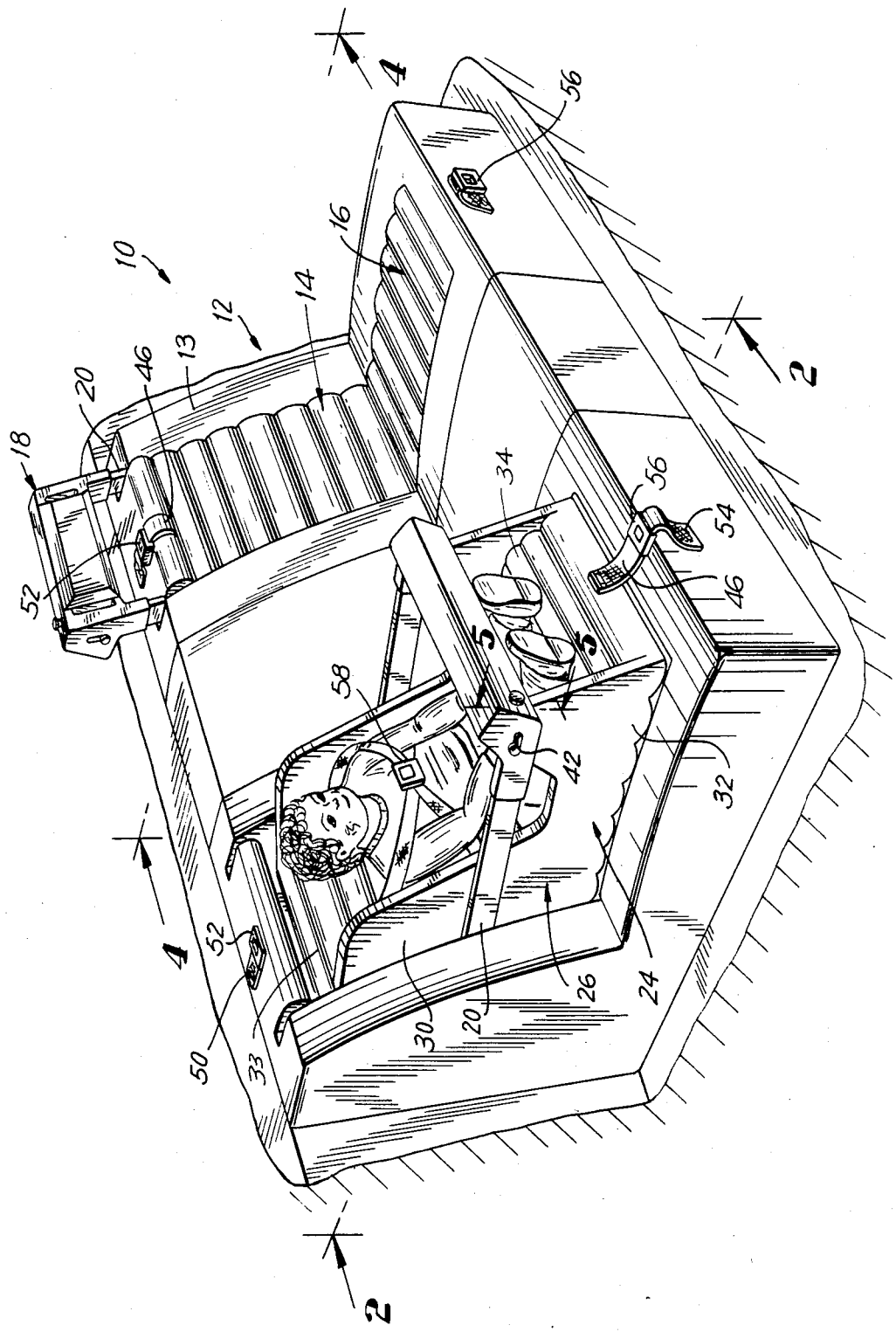
FIG. 1 is a perspective view of an automobile seat in accordance with the present invention, showing each adult section convertible to an infant or child seat, and showing the dual function of the head rest.

Referring now specifically to the drawings, in which identical or similar parts are designated by the same reference numerals throughout, and first referring to FIG. 1, a convertible automobile seat in accordance with the present invention is generally designated by the reference numeral 10. The seat 10 provides for the seating of two adults, each of the adult seats being shown to be convertible into an infant seat. It will be clear, however, from the discussion that follows, that the seat 10 can be provided with only one child seat and, therefore, accommodate only one child on one or the other side of the seat 10. Since each of the two seats of the seat 10 are identically constructed, only one will be described in detail, it being understood that the other seat has like construction. The convertible automobile seat 10 in FIG. 1 shows one of the infant seats extended to receive a child, while the other infant seat is in the retracted position to accommodate an adult, as will be more fully described below.

Each convertible automobile seat in accordance with the present invention includes a back rest section 12 which includes a fixed portion 13 which generally consists of fixed side or lateral portions, and a central movable portion 14. A conventional seat section 16 is provided which may be fixed relative to the automobile, although the back rest section 12 and the seat section 16 may be adjustably moved relative to each other to accommodate the comfort of a passenger in accordance with well known techniques. The present invention does not relate to the means used to adjust the general positions or orientations of the back rest section 12 and/or the seat section 16.

Similarly, while the fixed portion 13 is shown as a smooth surface while the movable and seat portions 14, 16 are shown tufted, the specific materials or upholstering methods used for the adult seat sections is not critical for purposes of the present invention.

An important feature of the present invention is the provision of a head rest 18 which is pivotally mounted for movements between an upper position generally above the back rest section 12 when the seat is to be used by an adult as shown at the right-hand or far view of FIG. 1, and in a lower position generally in front of the back rest section 12 when the seat is to be used by a child as shown at the left-hand or near view of FIG. 1.

When in the upper position, the surface of the head rest 18 facing the seat section 16 is advantageously suitably padded so as to provide a soft surface for the head of the adult. The entire head rest 18 is advantageously padded so as to provide soft surfaces for the child when used in the lower position as a restraint. However, the specific design or material used for the head rest 18 is not critical, except as hereinbelow noted.

The head rest 18 is connected at each end or side thereof to two levers or arms 20 which extend between the head rest 18 and pivot pins 22 for pivotally mounting the head rest 18 between the aforementioned positions as shown in FIG. 1. The arms 20 have substantially equal lengths selected to clear the back rest section 12 when the seat 10 is used by an adult and to engage a child seat 24, to be described, and restrain a child received in the child seat when the seat is used by a child.

The child seat 24, in the embodiment being described, is of unitary construction and includes side restraining walls 26 which are pivotally mounted on pivot pins 28. The restraining walls 26 include an upper wall portion 30, at the rear of the restraining wall 26, and a lower wall portion 32 at the front of the restraining wall 26 in the extended position of the child seat 24. In the child seat 24, being of unitary construction, the back rest 33 and lower seat section 34 are rigidly connected to each other and move together as a single unit between the extended and retracted positions. Referring to FIGS. 2 and 4, there is provided a space or storage compartment C behind the back rest section 12, in the retracted position of the child seat 24, which receives same as shown in FIG. 4 when the seat 10 is used by an adult. The compartment C may be a space within the seat 10 or may, when the seat 10 is a rear passenger seat, extend into the trunk space.

Referring to FIG. 5, a head rest lock 35 is provided which includes a loop or retainer 36 which defines an opening for receiving a latch or pin 38 mounted on the head rest 18 for movement between a locking position wherein the head rest is locked in the lower position as shown in FIG. 2 and an unlocked position which permits the head rest to be moved to the upper position shown in FIG. 4. According to one possible arrangement, the latch 38 consists of a pin mounted for slideable movement into and out of the loop or retainer 36. Advantageously, biasing means in the nature of a spring 40 is provided to resiliently urge the latch or pin 38 to the locking position of the lock 34. A release member 42 (as shown in FIG. 1) is provided which is attached to the pin 38 which permits the application of an external force to the pin to move same to the unlocked position against the action of the spring 40. The spring 40 may be in the nature of a compression or a tension spring, depending on which side of the pin 38 or release member 42 it is situated.

Once the head rest 18 is locked to the lower wall portions 32, the head rest provides the desired restraint on the child and advantageously cannot be inadvertently unlocked by the child.

Since the child seat 24 is pivotally mounted, it is important to fix its positions in either the extended or retracted positions thereof. Although this can be accomplished in a number of different ways, including a design which maintains the desired positions due to forces of gravity and/or friction, the approach shown in the drawings includes the use of a seat belt 46 which is attached to the forward end of the child seat 24 provided with a male buckle 48. Attached to the top of the seats 10 is a belt 50 provided with a female buckle 52 adapted to receive the male buckle 48 in the retracted position of the seat 24, as shown in FIG. 4.

When the child seat 24 is in the extended or open position, it may be retained in that position by engaging the male buckle 48 to a female buckle 56 attached to a belt 54 connected to the seat section 16. Connection of the buckle 48, therefore, to the buckle 52 will maintain the child seat 24 in the closed or retracted position, while connection with the buckle 56 will maintain the child seat 24 in the open or extended position.

Within the child seat 24, there is advantageously provided a conventional seat belt restraint 58 of the type commonly used in infant seats, although the nature or construction of the restraint 58 is not critical and any such restraint may be used.

Figure 6:
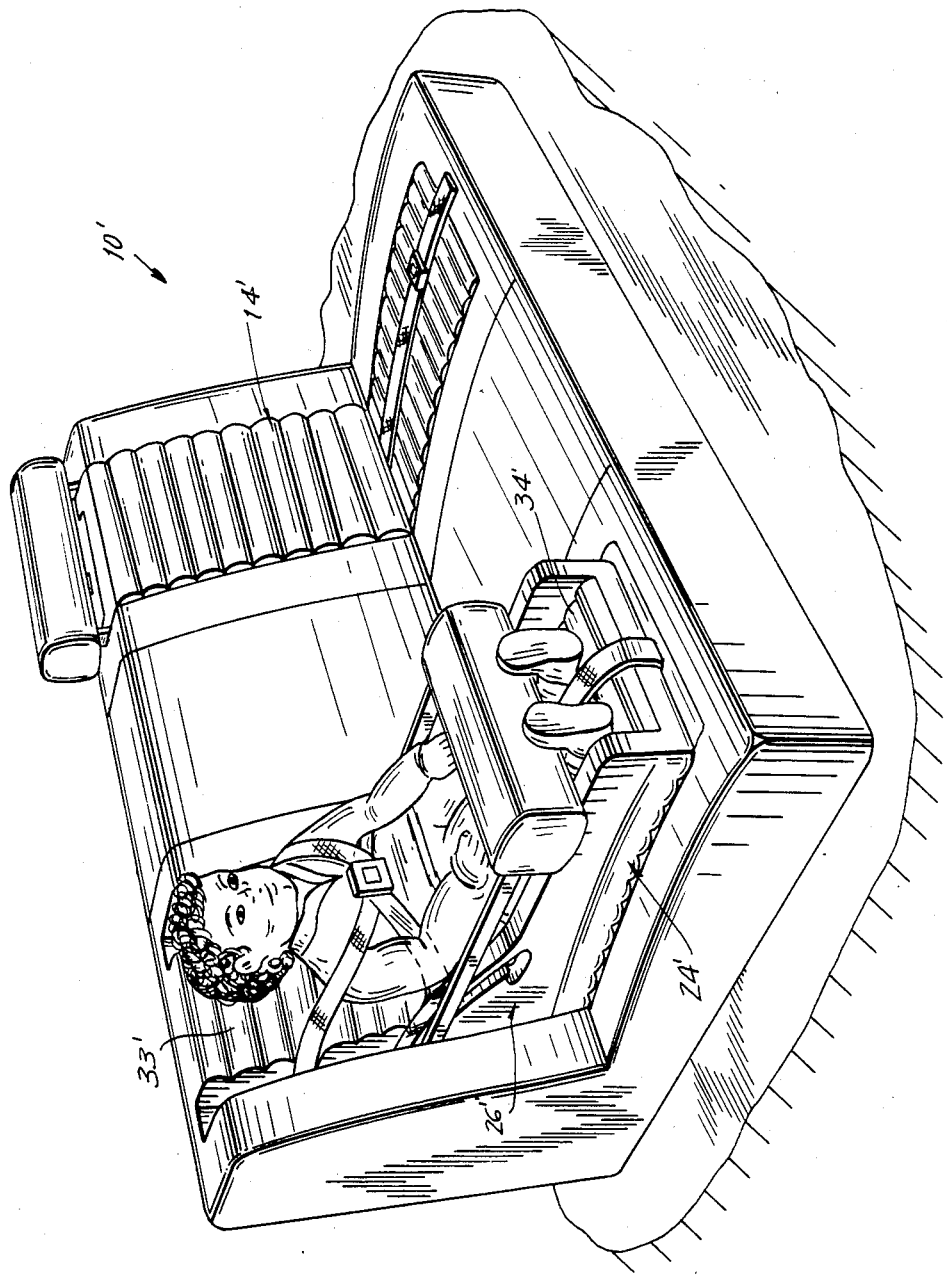
FIG. 6 is similar to FIG. 1, but showing another embodiment of the invention.

Another embodiment 10' of the invention is illustrated in FIG. 6. Here, while the central movable portion 14' forms part of a child seat 24', only the lower seat section 34 is pivotally mounted together with modified side restraining walls 26'. The child seat 24' is not of unitary construction as the previously described seat 10, and the back rest 33' remains fixed in all positions of the seat 10'. The lowering of the seat section 34 converts the seat 10' to a children's seat and exposes the back rest 33'. There is no need, therefore, to provide a separate storage compartment similar to the compartment C shown in FIGS. 2 and 4.

While the invention is described with reference to specific embodiments thereof and with respect to the incorporation therein of certain combinations of features, it is to be understood that the invention may be embodied in other forms, many of which do not incorporate all of the features present in this specific embodiment of this invention which has been described. For this reason, the invention is to be taken and limited only as defined by the claims that follow.

What is claimed is:

1. An automobile convertible seat comprising:
    (a) a back rest section and a seat section, said back rest section including a generally fixed portion and a movable portion and a storage compartment behind said back rest section;
    (b) a child seat pivotally mounted about fixed pivot points for movements between retracted and extended positions, said child seat being of unitary construction and including a back rest and a lower seat section which are rigidly connected to each other to thereby move together as a single unit between said extended and retracted positions, said child seat being substantially retracted within said storage compartment when the seat is to be used by an adult to position said movable back rest portion generally proximate to said fixed back rest portion, and said child seat being substantially extended exteriorily of said storage compartment for receiving a child and to position said movable back rest portion generally proximate to said seat section;
  (c) position maintaining means for selectively maintaining said child seat in said extended and retracted positions; and
  (d) restraining means for restraining a child placed in said child seat in the extended positon of said child seat.

2. A seat as defined in claim 1, wherein said back rest and seat sections are upholstered.

3. A seat as defined in claim 1, wherein said restraining means comprises a head rest pivotally mounted for movements between an upper position generally above said back rest section when the seat is to be used by an adult and in a lower positon generally in front of said back rest section when the seat is to be used by a child, whereby said head rest serves both to support the head of an abult in the retracted position of said child seat and serves to restrain a child from falling out of said child seta in the extended position of said child seat.

4. A seat as defined in claim 3, further comprising heat rest pivot means mounted on said fixed portion of said back rest section; and lever means extending between said head rest and said head rest pivot means, for pivotally mounting said heat rest.

5. A seat as defined in claim 4, wherein said lever means comprises two levers one on each side of said movable portion, said levers having substantially equal lengths selected to clear said back rest section when the seat is used by an adult and to engage said child seat and restrain a child received in said child seat when the seat is used by a child.

6. A seat as defined in claim 3, further comprising locking means for locking said head rest in the lower position thereof when the seat is used by a child.

7. A seat as defined in claim 1, wherein said restraining means comprises a seat belt.

8. A seat as defined in claim 1, wherein said position maintaining means comprises belt and buckle means on the fixed and movable portions of the convertible seat to secure the child seat in a selected position.

* * * * *